United States Patent [19]

Kornhaas

[11] 4,014,040
[45] Mar. 22, 1977

[54] APPARATUS FOR AUTOMATIC TRACK REGISTRATION

[75] Inventor: Wolfgang Kornhaas, Fuerth, Germany

[73] Assignee: E.M.V. Elektro-Mechanische Versuchsanstalt, Furth, Germany

[22] Filed: Feb. 6, 1974

[21] Appl. No.: 440,279

[30] Foreign Application Priority Data

Feb. 8, 1973 Germany .................. 2306197

[52] U.S. Cl. .................. 360/73; 360/77; 360/70
[51] Int. Cl.² .................. G11B 15/46
[58] Field of Search .................. 360/70, 73, 76, 77; 178/6.6 P

[56] References Cited

UNITED STATES PATENTS

| | | | |
|---|---|---|---|
| 2,916,547 | 12/1959 | Ginsberg | 178/6.6 P |
| 3,549,797 | 12/1970 | Dann | 360/73 |
| 3,562,427 | 2/1971 | Yano | 360/70 |
| 3,686,432 | 8/1972 | Deguchi | 360/70 |
| 3,764,755 | 10/1973 | Yamashita | 360/70 |

FOREIGN PATENTS OR APPLICATIONS

| | | | |
|---|---|---|---|
| 1,151,536 | 7/1963 | Germany | 360/70 |
| 1,130,845 | 6/1962 | Germany | 360/70 |

Primary Examiner—Bernard Konick
Assistant Examiner—Alan Faber

[57] ABSTRACT

An automatic track searching device for a magnetic video tape recorder/reproducer. Supply and take-up reels, a capstan, a pinch roller are associated with a guide drum. The drums helically encircled at a certain wrap angle by a magnetic tape. One or more video heads rotate in said guide drum and scan the tape in diagonal video tracks through a slot in said guide drum. The guide drum is equipped with a stationary track searching magnetic head within the aforementioned wrap angle. The magnetic gap of the stationary head is flush with the guide drum surface and has a length equal to the width and a direction perpendicular to the direction of the video tracks. The track searching head scans about the center of the magnetic tape in longitudinal direction to produce an amplitude-modulated high-frequency output voltage. The peaks of the output voltage are a measure of the actual position of the video tracks and are phase compared to rated position signals of the rotating video heads to form an error signal. The error signal is fed to the circuitry of a servomechanism cooperating with the capstan driving motor to minimize tracking error between the video heads and video tracks.

3 Claims, 6 Drawing Figures

APPARATUS FOR AUTOMATIC TRACK REGISTRATION

FIELD OF INVENTION

This invention relates to a device for automatic track searching during the reproduction of signals, especially video signals, magnetically recorded in parallel oblique tracks on a magnetic tape.

BACKGROUND

In one widely used apparatus for magnetic recording and/or reproducing of video signals, a magnetic tape is wrapped helically around a guide drum and driven, by a capstan and a pinch roller, from a supply reel to a take-up reel. The drum has a slot at right angles to its axis. Two recording or reproducing heads respectively rotate in the slot around this axis, scanning the magnetic tape in oblique or diagonal parallel lines. Usually, one video field or one video frame is recorded on one track with the vertical synchronizing signal in the neighborhood of the transition from one track to the next. Adjacent one edge of the tape, a control track is recorded or scanned by a stationary control head. During playback, the control pulses scanned by the head are compared to tachymetric or position pulses generated by the video head wheel motor, to make sure that the recording and reproducing heads exactly follow the tracks.

This can be accomplished when and only when, during the recording mode and during the reproducing mode, the tape length between the gap of the control head and the beginning of a track is substantially the same. This condition cannot, however, be fulfilled, partly because of mechanical tolerances between different machines, and partly because of different tape elongations under the influence of different tape tension or temperature. Therefore, ordinary tape recorders are equipped with a knob to manually adjust and readjust the phase of the control signals and to tune to the optimum signal-to-noise ratio. This procedure is not only cumbersome, but also difficult for laymen.

To overcome these difficulties, several automatic track searching devices have been proposed. In German Patent Application No. 2,116,206, which has been laid open to public inspection, for example, during playback, the tape transportation speed is slowly and periodically modulated which results in an amplitude modulation of the scanned video signal. The amplitude modulation is then detected and used to readjust the position of the rotating video heads. This method, however, is very expensive and cannot be employed if the video signal itself holds or contains some amplitude modulated information, as is usually the case with color video recordings. Furthermore, the velocity modulation deteriorates the quality of the sound track and requires certain limitations.

In another method (German Patent Application 2,048,633 which has been laid open to public inspection) during recording, special pulses are inserted into the trailing porch of the line synchronizing signals which can be extracted during playback and used to control the servo mechanism of the motors. This method, too, is expensive and fails obviously in the overwhelming plurality of tapes not specially prepared during recording.

SUMMARY OF INVENTION

An object of the invention is to provide a simple and cheap device for automatic track search, which will avoid the above-named disadvantages, and which will also be suitable particularly for recordings which have not been specially prepared.

Another object of the invention is to eliminate the need for a separate control track on the magnetic tape.

To achieve the above and other objects of the invention, there is provided an improved automatic track searching device for a magnetic video tape recorder-reproducer. This device comprises supply and take-up reels, a capstan, a pinch roller and a guide drum helically encircled at a certain wrap angle by the magnetic tape. The device further includes one or more video heads rotating in said guide drum and scanning said tape through a slot in said guide drum in diagonal video tracks. The guide drum is equipped with a stationary track searching magnetic head within said wrap angle. The magnetic gap of the latter said head is flush with the guide drum surface and has a length equal to the width and a direction perpendicular to the direction of said video tracks. The track searching head scans about the center of the magnetic tape in longitudinal direction to produce an amplitude-modulated high-frequency output voltage. The peaks of said output voltage are a measure of the actual position of said video tracks and are phase compared to rated position signals of said rotating video heads to form an error signal. The error signal is fed to the circuitry of the servomechanism of said capstan driving motor to minimize tracking error between said video heads and said video tracks.

As a feature of the invention, the cylinder has a mantle with which the head is flush mounted.

As a further feature of the invention, the gap is fixed to be perpendicular to the track recordings.

The head is adapted to generate a maximum possible e.m.f. from the track recordings and there is provided a threshold amplifier coupled to the head and having a threshold voltage smaller than the maximum possible e.m.f. but larger than a voltage which relates to the maximum possible e.m.f. as the track width less the space between tracks to the whole track width.

According to a further feature of the invention, there are provided integrator means and differential amplifier means coupled in series between the threshold amplifier and the phase comparator means.

Two rotating video heads may be provided and the track search head is preferably located closer to the position at which the tape leaves the aforementioned cylinder than the position at which the tape meets said cylinder.

BRIEF DESCRIPTION OF THE DRAWINGS

The invention will be more clearly understood from the detailed description which follows hereinafter as illustrated in accompanying drawing in which.

DETAILED DESCRIPTION

Figure 1:
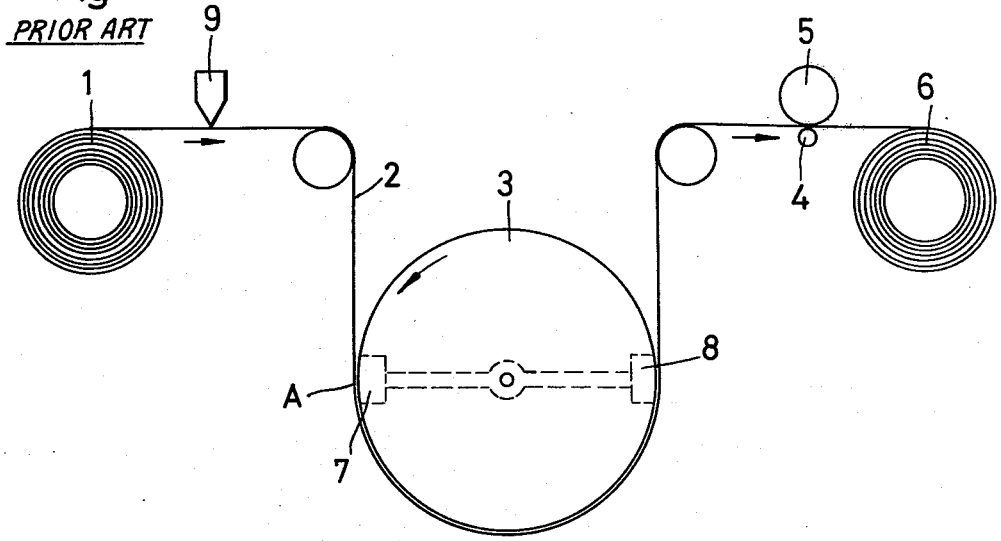
FIG. 1 diagrammatically illustrates the feeding of a video magnetic tape from a supply reel to a take-up reel, the tape passing around a transverse cylinder, as is known from the prior art.

According to FIG. 1, a magnetic tape 2, which comes from a supply spool 1, helically surrounds a guide drum 3. The helical pitch is about equal to the width of the magnetic tape, while the tape passes through a wrap angle (180° in FIG. 1). The magnetic tape is transported at constant speed to the takeup spool with the aid of a capstan 4 and a pinch roller 5. In the cylindrical guide drum 3, two magnetic heads 7 and 8 rotate. Their magnetic gaps contact the magnetic tape, and the video signals are delivered to them in suitable prepared form.

Figure 2:
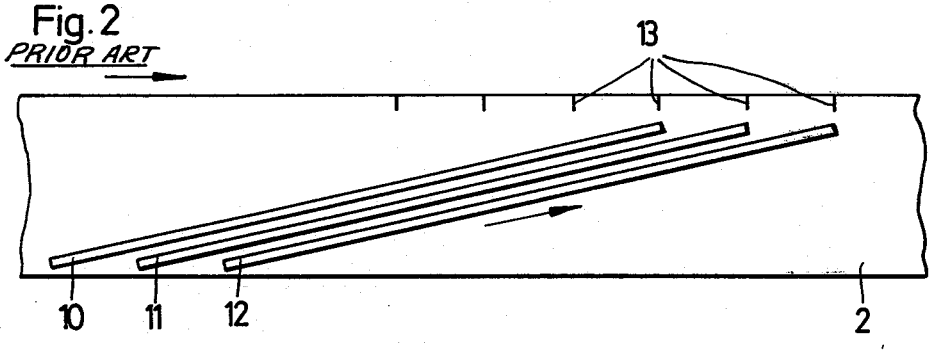
FIG. 2 illustrates a tape with oblique video tracks thereon, as is also known from the prior art.

As seen in FIG. 2, the video tracks 10, 11 and 12, are recorded and lie diagonally on the magnetic tape. A video field or a video frame is recorded on each diagonal track. In order to avoid picture disturbances during reproduction, when a transition is made from one diagonal track to the next, the vertical synchronizing signals are located in the immediate neighborhood of these transitions.

Figure 3:
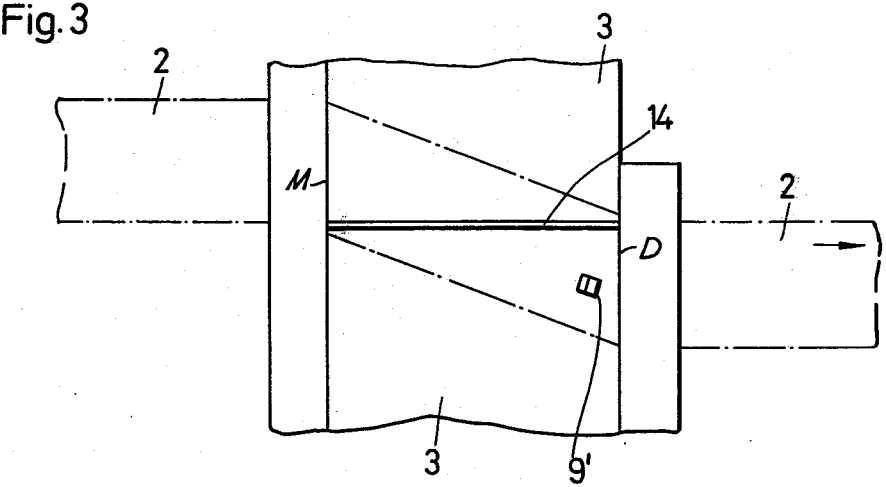
FIG. 3 diagrammatically illustrates a provision of the invention involving the positioning of a track search head.

The invention proceeds from the recognition that changes in tape length between the gaps of the control head 9 and the video heads 7 and 8 are negligibly small when head 9 is in the immediate vicinity of heads 7 and 8 and is built into the cylindrical guide drum 3 so that its magnetic gap terminates in contact with the mantle surface of body 3. These circumstances are shown in FIG. 3, which gives a schematic side view of the guide drum 3. In the slot 14 of cylinder 3, the video heads rotate, and the position of magnetic tape 2 is shown by dash-dot lines, while the track search head 9' is built into guide drum 3 in such a manner that it scans the video tracks in the lengthwise direction of the tape, approximately in the middle of the tape and preferably in the neighborhood D where the tape leaves, rather than at position M where the tape meets the guide drum.

The video signal is recorded in the form of a frequency modulated carrier wave. Consequently, the e.m.f. induced in the track search head 9' has the form of an amplitude modulated oscillation with a frequency that is diminished with respect to the original frequency by an amount proportional to the difference of the rotating head speed and the tape transport speed. Its envelope curve has a maximum.

Figure 4:
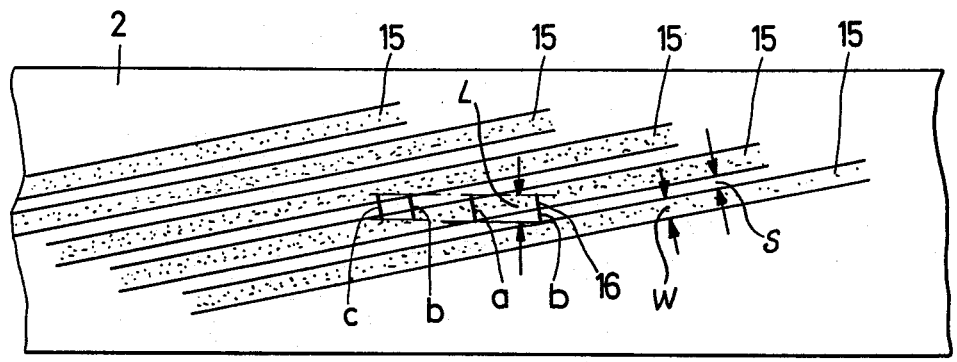
FIG. 4 illustrates the video magnetic tape with the gap of the aforesaid search head disposed in different positions relative to the track recordings as the tape is moved longitudinally along the length thereof.

FIG. 4 shows several video tracks 15 enlarged on a magnetic tape 2 (not to scale). The magnetic gap 16 of the track search head 9' is furthermore drawn in various positions relative to the video tracks. If the gap 16 is in position a, then naturally the largest e.m.f. is induced. During transport of the magnetic tape, the induced e.m.f. falls linearly to position b, where the gap 16 touches the next video track. During further tape transport, the gap 16 scans two video tracks in position c. Since the high frequency oscillations of the two tracks, which are now scanned simultaneously, are uncorrelated, a disordered region occurs with total extinction, with positive and negative amplitude of the head-e.m.f., which, however, even in unfavorable cases cannot become larger than the value reached in position b. According to a special feature of the invention, these disordered areas are suppressed by means of a threshold amplifier so they do not make any contribution to the track search automatic procedure.

Figure 5:
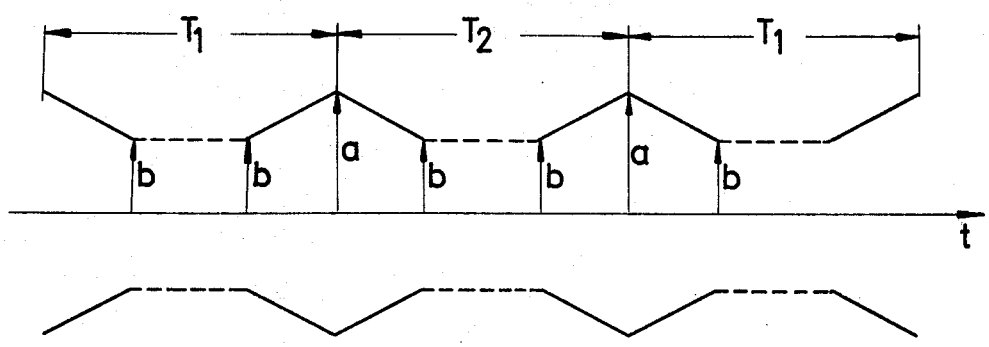
FIG. 5 is a signal diagram illustrating signals which are generated according to the relative movement indicated in FIG. 4.

FIG. 5 shows the temporal course of the head-e.m.f. in another comprehensive representation. The fundamental frequency of the envelope curve is equal to the frame frequency, when one frame is recorded per track. It is equal to the field frequency, when a field is recorded per track. The mentioned threshold value corresponds to an amount which the envelope-curve e.m.f. reaches approximately in position b, or it can be somewhat larger.

Figure 6:
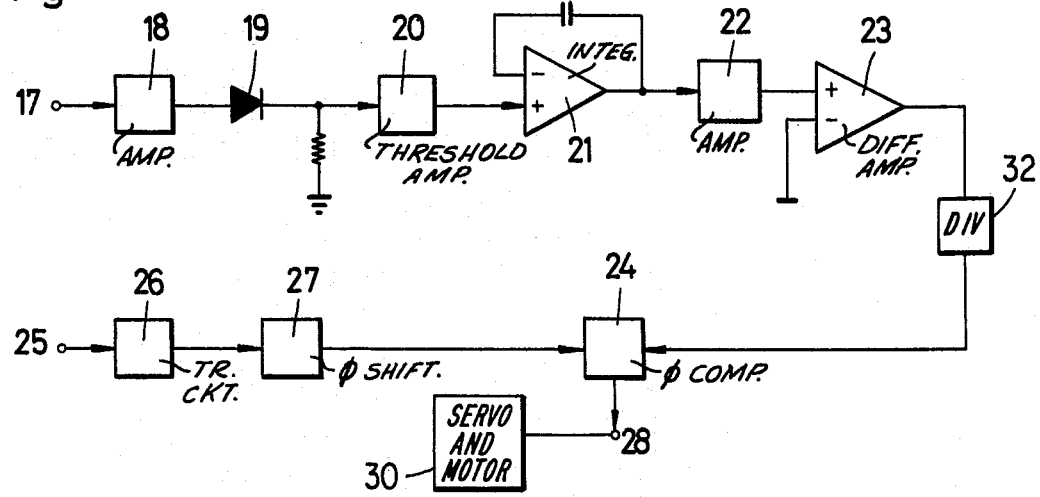
FIG. 6 is a block diagram of a circuit by means of which error signals are generated utilizing the envelope of FIG. 5 and position indicating pulses on the magnetic tape being processed.

FIG. 6 shows a complete embodiment of the track search automatic process in accord with the invention. Here the e.m.f. induced in the track search head 9' is brought to terminal 17. It is preamplified in amplifier 18, and is demodulated with diode 19. Component 20 is the threshold amplifier which eliminates the undefined amplitude regions. Component 21 is an integrator to suppress short-term disturbances and drop outs. Component 22 is an amplifier tuned to the fundamental wave of the envelope curve. Component 23 is a difference amplifier of very high amplification, which delivers square-wave impulses to the phase comparator 24. Position indicator impulses are brought to terminal 25. These are required for the servo control on the head wheel motor, and represent a measure of the instantaneous angular position of the video head. The position generating impulses are transformed in circuit 26, if necessary, in accord with the requirements of the phase comparator 24. They are then brought to a phase shifter 27. This not only compensates all angular errors occurring within the electronic circuitry, but also establishes agreement between the beginning of the track A in FIG. 1, and the at first undefined position of the track search head 9' in FIG. 3. Thus the structural position of track search head 9' becomes non-critical, and need not be provided with close tolerances. The setting of the phase shifter 27 is made once, and is machine-specific. The error signal generated in comparator 24 is brought over terminal 28 to the control element of the tape transport servo and motor indicated at 30.

Helical scan recordings may be made with one rotating video head with about a 360° wrap or, as in FIG. 1, with two rotating video heads, with about a 180° wrap. With these two-head machines, it may happen that the gaps of video heads 7 and 8 are not exactly in the same axial plane, so that then the spaces between tracks 15 in FIG. 4 are not exactly the same, and the time T1 in FIG. 5 is not exactly the same as T2. This results in an uneven running which can be avoided if, according to a special feature of the invention, for two-head machines, a 2:1 divider 32 is inserted, for example, between the amplifier 23 and the phase comparator 24 in FIG. 6.

As seen from the above, there is provided apparatus for automatic track searching during playback of magnetic helical scan recordings of video signals. The amplitude of the envelope curve of the scanned video signals serves as a criterion for the track deviation, and is compared with a rated value. From this comparison, an error signal is derived which represents the track deviation. The signal regulates the transport velocity of the magnetic tape. The apparatus is characterized by a stationary track search head 9'. This head is built flush with the mantle surface of the guide drum 3, inside the area surrounded by the magnetic tape. The head's magnetic gap runs perpendicular to the video track, and its gap length L is equal to the width W of the video track.

The apparatus is further characterized by a threshold amplifier which follows this track search head. Its control voltage is smaller than the maximum possible head-e.m.f., but larger than a voltage which has that proportion to the maximum possible head-e.m.f. as the track width which is diminished by the space S between the tracks has to the full track width.

The apparatus for automatic track searching in accordance with the invention is further characterized by the fundamental waves of the envelope curve of the e.m.f. induced in track search head 9' being used as an actual value signal, which is phase compared with the position generating impulses of the head wheel motor as the rated value signals.

Further, the apparatus is characterized by an adjustable phase shifter for the position generating impulses, to compensate for electronically produced error angles and mechanically conditioned constructive tolerances.

The apparatus of the invention can be used for automatic track search during playback of magnetic helical scan records which are produced by two rotating video heads. This case is characterized by halving the fundamental wave frequency of the envelope curve of the e.m.f. induced in the track search head 9'. It is further characterized by use of the envelope curve fundamental wave, whose frequency has been halved, as an actual value signal, in a phase comparison with the position generating impulse of the head wheel as rated value signal.

What is claimed is:

1. An automatic track searching device for a magnetic video tape recorder/reproducer comprising magnetic tape supply and take-up reels, tape transport means operatively associated with said reels, a guide drum provided with a slot and helically encircled at a determinable wrap angle by the magnetic tape, at least one video head rotating in said guide drum and scanning said tape through said slot in diagonal video tracks, and a stationary track finding magnetic head in said guide drum within said wrap angle and having a magnetic gap flush with the guide drum surface and having a length equal to the width and a direction perpendicular to the direction of said video tracks; said track finding head scanning about the center of the magnetic tape in longitudinal direction to produce an amplitude-modulated high-frequency output voltage, the peaks of said output voltage being a measure of the actual position of said video tracks; a threshold amplifier, said output voltage, after being amplified and rectified, being applied to said threshold amplifier, said threshold amplifier having a threshold voltage which is lower than the peak of said output voltage and higher than said peak voltage multiplied by the difference of said video track width and the interspace between said video tracks and divided by said video track width; a phase comparator, the output of said threshold amplifier being connected to said phase comparator and being phase compared with the rated position signals of said rotating video head to form an error signal; said error signal being applied to said tape transport means to readjust the relative positions of said tape and said rotating video head so as to minimize tracking error between said video head and said video tracks.

2. An automatic track searching device as claimed in claim 1, comprising adjustable phase shifting means between said signal means and phase comparator for said rated position signals of said rotating video head to compensate for stationary phase errors in circuitry and machinery.

3. An automatic track searching device as claimed in claim 1 arranged for the reproduction of video tracks recorded by two rotating video heads comprising means between said threshold amplifier and said phase comparator to divide by two the fundamental wave frequency of said threshold amplifier output voltage.

* * * * *